United States Patent

Dessureault

[15] 3,647,384
[45] Mar. 7, 1972

[54] CORE FOR SILICON CARBIDE FURNACE

[72] Inventor: Jean-Marie Dessureault, Niagara Falls, Ontario, Canada

[73] Assignee: The Carborundum Company, Niagara Falls, N.Y.

[22] Filed: July 1, 1968

[21] Appl. No.: 741,739

[52] U.S. Cl. ........................................... 23/208, 23/277, 13/25
[51] Int. Cl. .................. C01b 31/36, B01j 6/00, F27b 14/06
[58] Field of Search ........................................... 23/208 A

[56] References Cited

UNITED STATES PATENTS

| 560,291 | 5/1896 | Acheson | 23/208 A |
| 2,110,733 | 3/1938 | Kinzie et al. | 23/208 A X |

Primary Examiner—M. Weissman
Attorney—K. W. Brownell

[57] ABSTRACT

Silicon carbide is produced commercially by the reaction of carbon and silica in a carbon core electrical resistance furnace. According to the present invention, an improved core for such a furnace comprises a nonconductive combustible tube packed with carbon.

7 Claims, 2 Drawing Figures

PATENTED MAR 7 1972

3,647,384

*INVENTOR.*
JEAN-MARIE DESSUREAULT
BY
*K.W. Brunell*

CORE FOR SILICON CARBIDE FURNACE

BACKGROUND OF THE INVENTION

The present invention relates to an improved core for use in carbon core electrical resistance furnaces employed for the production of silicon carbide.

Silicon carbide is a well-known material of commerce which is useful in a wide variety of applications, for example, as an abrasive, as an ingredient of wear resistant articles, as a refractory material, and as an ingredient of electrical heating elements.

Commercially, silicon carbide is generally produced by the reaction of silica, usually in the form of sand, and carbon, often in the form of coke or anthracite coal, the reaction being carried out in a carbon core electrical resistance furnace. In addition to silica and carbon, the furnace charge often contains a material such as sawdust of an agent to increase the porosity of the mixture and thus facilitate the migration of gases generated during the reaction.

Resistance furnaces employed in carrying out the reaction are commonly referred to as Acheson furnaces. They comprise a pair of end walls or heads at either end of the furnace, connected by sidewalls on either side of the furnace, forming a trough which may be 60 feet or more long and 10 feet or more wide. The walls are customarily constructed of firebrick. Electrodes extend through each of the end walls to provide a means of introducing electrical power into the furnace, the electrodes being externally connected to a power source.

In preparing the furnace for operation, the lower portion of the trough is first filled with the silica-carbon mix, up to the level of the electrodes. A trench is then formed in the mix, extending from the electrode in one furnace head to the electrode in the other, as a preliminary step in preparing the carbon core. The core is then prepared by filling the trench with carbon, i.e., graphite, calcined petroleum coke or any other suitable carbonaceous material. The carbon may be tamped lightly for compaction. The carbon core thus formed assumes the shape of the trench, the width and depth of which are selected to produce a core of dimensions which are suited to the furnace. After the core has been formed, each end thereof is brought into intimate electrical contact with the corresponding electrode by surrounding the end of the core with graphite and placing additional graphite between the core and the electrode so that the face of the electrode is covered with graphite. The core is then covered with additional silica-carbon mix and the furnace is filled to capacity.

Electric current is then passed between the electrodes through the core, generating heat which effects the reaction. After a suitable time, the current is turned off and the furnace is allowed to cool. The sidewalls are removed, and after removing the enclosing layers of unreacted and partially reacted material, a central cylinder of silicon carbide extending from one head to the other remains and is recovered.

It will be observed that the conventional method of forming the carbon core, as described above, is quite inconvenient, cumbersome and time consuming. An even more serious disadvantage of cores formed by the conventional method is that such cores vary considerably in density and lack uniformity of cross section along the length of the core. Such variation in density and nonuniformity of cross section seriously adversely affect the operation of the furnace and the power carrying characteristics of the core. Unequal resistance of the core along its length may occur, giving rise to unduly hot regions of the core which may, in turn, cause eruption of the silica-carbon mix in the furnace at locations corresponding to such regions. Indeed cores have been formed by the conventional method which were so lacking in uniformity as to result in an inoperative furnace. It is clear that cores of consistent density and uniform cross section are highly advantageous in the interest of good and reproducible yields, heating characteristics and electrical characteristics.

SUMMARY OF THE INVENTION

It is therefore an object of this invention to provide a carbon core for use in electrical resistance furnaces for the production of silicon carbide which core is of relatively consistent density and uniform cross section throughout its length.

The object of this invention is achieved by employing, as a core, a nonconductive (i.e., not capable of conducting electricity) combustible tube packed with carbon.

BRIEF DESCRIPTION OF THE DRAWING

The invention will be described in greater particularity with reference to the drawing, wherein.

DESCRIPTION OF THE PREFERRED EMBODIMENTS

Figure 1:
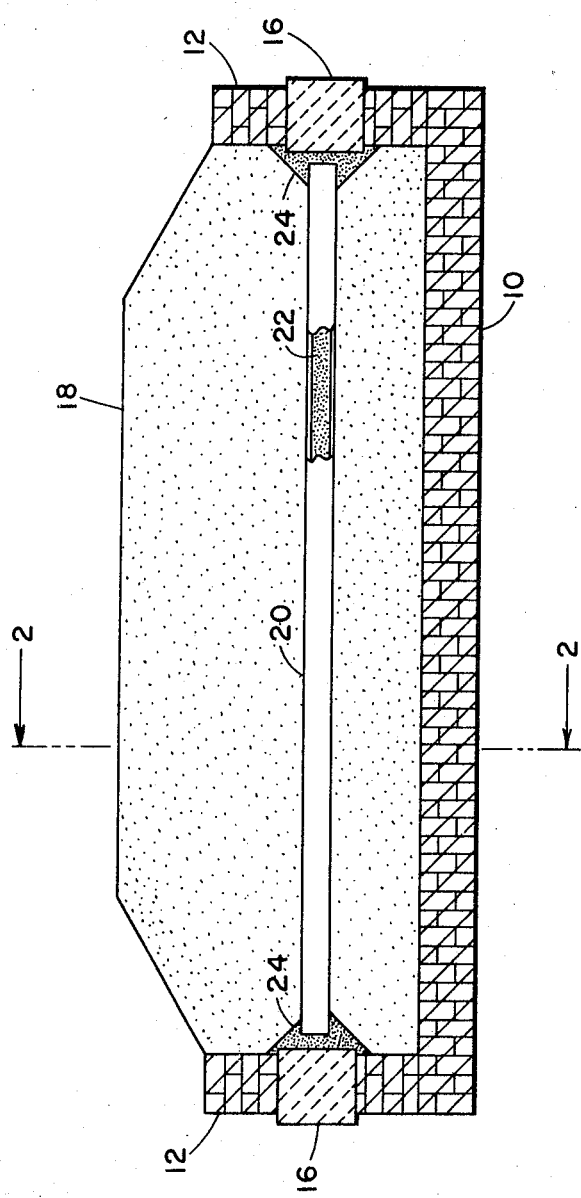
FIG. 1 is a central, vertical, longitudinal sectional view through a typical electrical resistance silicon carbide furnace, schematically illustrating such furnace loaded with charge and provided with a core in accordance with the present invention.
Figure 2:
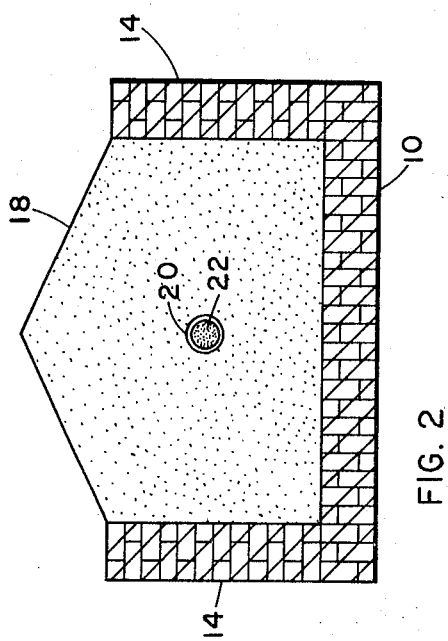
FIG. 2 is a central, vertical, transverse sectional view through the furnace, taken generally along line 2—2 of FIG. 1.

Referring now to the drawing, an electrical resistance furnace is shown comprising a floor 10, end walls or heads 12 (FIG. 1) and sidewalls 14 (FIG. 2), each being constructed of a suitable heat resistant material such as firebrick. Electrodes 16 (FIG. 1) composed of a suitable electrically conductive material such as graphite extend through the heads 12 and externally connected to a source of electric current (not shown). The furnace is filled with a charge 18 consisting essentially of silica and carbon. Embedded in the charge and extending lengthwise through the furnace at the level of the electrodes 16 is a core in accordance with the invention comprising a nonconductive, combustible tube 20 composed of paper, plastic or other suitable material and packed with carbon 22. The ends of the tube 20 are in proximity to the inner ends of the electrodes 16 and are electrically contacted therewith via substantially frustoconically shaped piles of graphite 24.

In practice, the core is conveniently prepared by supporting the tube in a vertical position, covering the lower end, and filling the tube with carbon which is introduced at the upper end. The upper end is then covered in preparation for introduction of the core into the furnace. Conveniently, the furnace is first filled with charge up to the level of the electrodes. The core is then laid in place and the covers are removed from each end, and the piles of graphite are positioned at each end to secure electrical contact with the electrodes. The furnace is then filled to capacity with charge. The furnace may then be operated conventionally.

Upon application of an electrical current to the core, heat is generated, resulting in combustion of the tube. A carbon residue may remain but this is of no consequence, such carbon merely being available along with that in the charge to react with silica. The carbon with which the tube was packed serves as the conductive core, which is superior to conventional cores in having a relatively consistent density and uniform cross section along its entire length.

EXAMPLE

The furnace employed was substantially as shown in the drawing, being 48 feet (14.6 meters) long between the heads and 8 feet (2.4 meters) wide between the sidewalls, which were 5 feet (1.5 meters) high. The charge consisted of a mixture of 61,280 pounds (27,800 kg.) of delayed petroleum coke analyzing 86 percent free carbon, 87,000 pounds (39,500 kg.) of silica sand, and 290 cubic feet (8.1 cubic meters) of sawdust, mixed with sufficient water so the mixture would ball in the hand.

A core was prepared according to the invention, as follows. A paper tube 42 feet (12.8 meters) long having a circular cross section with an inner diameter of 7⅛ inches (18 cm.) and a wall thickness of three-sixteenths inch (0.5 cm.) was positioned vertically on end, and the lower end was covered with a piece of paper held in place with pressure sensitive tape. The tube was packed with a mixture consisting of 20 percent graphite and 80 percent calcined petroleum coke crushed to a particle size of 1 inch (2.5 cm.) and finer, this mixture being introduced at the top of the tube, which was tapped occasionally to aid packing. When the tube was completely packed with the mixture, the upper end of the tube was covered with paper in the same manner as the lower end.

The furnace was filled with the charge up to a level of about 52 inches (1.3 meters), this being the approximate level of the bottom of the electrodes in the furnace. The core was then laid in place on top of the charge with its ends in proximity to the electrodes, each end being about 3 feet (0.9 meter) from the corresponding electrode. The paper covers were removed from the ends of the tube, and a substantially frustoconically shaped pile of graphite was arranged at each end of the tube whereby to contact the ends of the tube and the faces of the electrodes. The furnace was then filled to capacity with the charge, which extended above the level of the furnace walls in pyramidal fashion.

The power was then turned on and the furnace was operated for 1 hour at a current rising to 2,000 kilowatts and then for about 35 hours at about 3,000 kilowatts. After turning off the power and allowing the furnace to cool, the unreacted and partially reacted charge was removed, and there remained a cylinder of silicon carbide about 5 feet (1.5 meters) in diameter extending the length of the furnace. From this cylinder, 39,885 pounds (18,000 kg.) of silicon carbide was recovered, representing an efficiency of 0.368 pounds/kilowatt-hour (167 g./kilowatt-hour).

The tube employed in carrying out the invention may be composed of any nonconductive, combustible material such as paper or plastic. The tube is preferably relatively rigid and should be sufficiently strong to contain the carbon without rupturing. Heavy paper, or cardboard, tubes are especially suitable. As long as the tube is sufficiently strong, the precise wall thickness is of little consequence, having no appreciable effect upon the operation of the furnace. Paper tubes having wall thicknesses of from ⅛ inch (0.3 cm.) to ¼ inch (0.6 cm.) have been tried and have proven satisfactory.

If desired, the tube may be provided with external support, as by fastening a piece of angle iron along the length of the tube with metal straps. Such support serves to prevent buckling of the tube while filling it and placing it in the furnace, after which the support may be removed.

Round tubes of substantially circular cross section are most conveniently available, and may be employed in any suitable diameter, although tubes having any other desired cross section, such as rectangular, may be used if desired.

It is preferred that the tube be a single tube of sufficient length to extend substantially from one end of the furnace to the other. Alternatively, sections of tubing may be employed, being laid end to end in the furnace, the ends being joined by any suitable means such as pressure sensitive tape. A single tube is preferred, however, to eliminate any problem which might otherwise arise in respect to uniformity of the core at the joints.

The carbon with which the tube is packed may be of any variety which may be used in forming a core without the tube. Materials which are commonly employed include graphite, calcined petroleum coke, and mixtures thereof.

One advantage of the cores of the invention is that they may be prepared in advance and stored until needed. They are quickly and easily placed in the furnace. They are straight, and the carbon is of substantially uniform cross section and density throughout the length of the furnace, thus affording good and reproducible yields and reproducible electrical and heating characteristics.

While the invention has been described herein with reference to certain specific embodiments, it will be apparent to those skilled in the art that various modifications may be made without department from the spirit of the invention or the scope thereof as defined in the claims.

Except as otherwise specified, percentages specified herein are percentages by weight.

I claim:

1. In a process for the manufacture of silicon carbide by reacting carbon and silica in a carbon core electrical resistance furnace, the improvement consisting of packing a preformed, nonconductive, combustible tube having a substantially uniform cross section throughout its length with carbon and then inserting the packed tube into the furnace to serve as the core thereof.

2. A process as set forth in claim 1 wherein said tube is constructed of a material selected from the group consisting of paper and plastic.

3. A process as set forth in claim 1 wherein said tube is constructed of paper.

4. A process as set forth in claim 1 wherein said tube is of substantially circular cross section.

5. A process as set forth in claim 4 wherein said tube is constructed of a material selected from the group consisting of paper and plastic.

6. A process as set forth in claim 4 wherein said tube is constructed of paper.

7. A process as set forth in claim 1 wherein said tube is a single tube of sufficient length to extend substantially from one end of the furnace to the other.

* * * * *